US012056778B2

(12) United States Patent
Takada et al.

(10) Patent No.: US 12,056,778 B2
(45) Date of Patent: Aug. 6, 2024

(54) DATA DISTRIBUTION CONTROL APPARATUS, DATA DISTRIBUTION CONTROL METHOD, AND NON-TRANSITORY COMPUTER-READABLE MEDIUM

(71) Applicant: NTT Communications Corporation, Tokyo (JP)

(72) Inventors: Tomonori Takada, Kamakura (JP); Hideaki Akabori, Yokohama (JP); Tsunechika Kishida, Yokohama (JP); Yoshihiko Kobayashi, Tokyo (JP); Masataka Suzuki, Tokyo (JP); Tohru Minakuchi, Yokohama (JP)

(73) Assignee: NTT Communications Corporation, Tokyo (JP)

( * ) Notice: Subject to any disclaimer, the term of this patent is extended or adjusted under 35 U.S.C. 154(b) by 56 days.

(21) Appl. No.: 17/944,903

(22) Filed: Sep. 14, 2022

(65) Prior Publication Data
US 2023/0005085 A1 Jan. 5, 2023

Related U.S. Application Data

(63) Continuation of application No. PCT/JP2021/011120, filed on Mar. 18, 2021.

(30) Foreign Application Priority Data

Mar. 19, 2020 (JP) .................... 2020-049208

(51) Int. Cl.
G06Q 50/04 (2012.01)
G05B 19/418 (2006.01)
G06F 16/182 (2019.01)

(52) U.S. Cl.
CPC .......... *G06Q 50/04* (2013.01); *G05B 19/418* (2013.01); *G06F 16/182* (2019.01)

(58) Field of Classification Search
CPC ...... G06Q 50/04; G05B 19/418; G06F 16/182
See application file for complete search history.

(56) References Cited

U.S. PATENT DOCUMENTS 8,015,455 B1 * 9/2011 Vannatter ........... G06Q 20/1085
714/48
9,779,611 B1 * 10/2017 Krayer ................ G16H 50/20
(Continued)

FOREIGN PATENT DOCUMENTS

| EP | 3309682 A1 | 4/2018 |
| EP | 3102018 B1 | 9/2019 |

(Continued)

OTHER PUBLICATIONS

U.S. Appl. No. 17/944,895, filed Sep. 14, 2022, Data Distribution Control Apparatus, Data Distribution Control Method, And Non-Transitory Computer-Readable Medium.
(Continued)

*Primary Examiner* — Mohamed Barakat
(74) *Attorney, Agent, or Firm* — Knobbe, Martens, Olson & Bear, LLP

(57) ABSTRACT

The confidentiality of data is maintained in a case where analysis of an operation state of a facility is entrusted to the outside. An embodiment of the present invention is configured to chronologically store log data in a first storage medium, and store attribute information indicating a relevance between a type of a failure expected to occur in a facility and each of a plurality of data users; The embodiment is further configured to select, at the occurrence of a failure in the facility, a data user who has a relevance to a type of the failure from among the plurality of data users based on the attribute information, selectively read log data (Continued)

relating to an operation state of the facility in which the failure has occurred, and transmits the read log data to the selected data user.

8 Claims, 7 Drawing Sheets

(56) References Cited

U.S. PATENT DOCUMENTS

| | | | |
|---|---|---|---|
| 11,262,744 B2 | 3/2022 | Kamiguti et al. | |
| 2001/0056335 A1 | 12/2001 | Ikeda et al. | |
| 2002/0035447 A1 | 3/2002 | Takahashi et al. | |
| 2009/0106601 A1 | 4/2009 | Ngai et al. | |
| 2009/0204858 A1* | 8/2009 | Kawaba | G06F 11/0784 709/206 |
| 2010/0100521 A1 | 4/2010 | Fujimaki et al. | |
| 2013/0173964 A1* | 7/2013 | Okano | G06F 11/079 714/48 |
| 2016/0006709 A1* | 1/2016 | Sakurai | H04L 63/08 726/6 |
| 2019/0258233 A1 | 8/2019 | Taira et al. | |
| 2019/0310620 A1 | 10/2019 | Kamiguti et al. | |
| 2023/0017634 A1 | 1/2023 | Takada et al. | |
| 2023/0019594 A1 | 1/2023 | Takada et al. | |

FOREIGN PATENT DOCUMENTS

| | | |
|---|---|---|
| JP | H06-218660 A | 8/1994 |
| JP | H11-327627 A | 11/1999 |
| JP | 2002-093676 A | 3/2002 |
| JP | 2003-032764 A | 1/2003 |
| JP | 2004-036506 A | 2/2004 |
| JP | 2004036506 A * | 2/2004 |
| JP | 2006-202151 A | 8/2006 |
| JP | 2009-053795 A | 3/2009 |
| JP | 2015-142032 A | 8/2015 |
| JP | 2019-185292 A | 10/2019 |
| WO | WO 2021/187562 A1 | 9/2021 |
| WO | WO 2021/187563 A1 | 9/2021 |
| WO | WO 2021/187564 A1 | 9/2021 |

OTHER PUBLICATIONS

U.S. Appl. No. 17/944,912, filed Sep. 14, 2022, Data Distribution Control Apparatus, Data Distribution Control Method, And Non-Transitory Computer-Readable Medium.
European Extended Search Report for EP Application No. 21771006.0, dated Jul. 21, 2023, in 9 pages.
European Extended Search Report for EP Application No. 21770864.3, dated Jul. 21, 2023, in 5 pages.
European Extended Search Report for EP Application No. 21771079.7, dated Jul. 11, 2023, in 9 pages.
International Search Report and Written Opinion for PCT Application No. PCT/JP2021/011120, dated Jun. 8, 2021, in 10 pages.
International Search Report and Written Opinion for PCT Application No. PCT/JP2021/011121, dated Jun. 8, 2021, in 12 pages.
International Search Report and Written Opinion for PCT Application No. PCT/JP2021/011122, dated Jun. 8, 2021, in 10 pages.
International Preliminary Report on Patentability for PCT Application No. PCT/JP2021/011120, dated Sep. 29, 2022, in 10 pages.
International Preliminary Report on Patentability for PCT Application No. PCT/JP2021/011121, dated Sep. 29, 2022, in 12 pages.
International Preliminary Report on Patentability for PCT Application No. PCT/JP2021/011122, dated Sep. 29, 2022, in 10 pages.

* cited by examiner

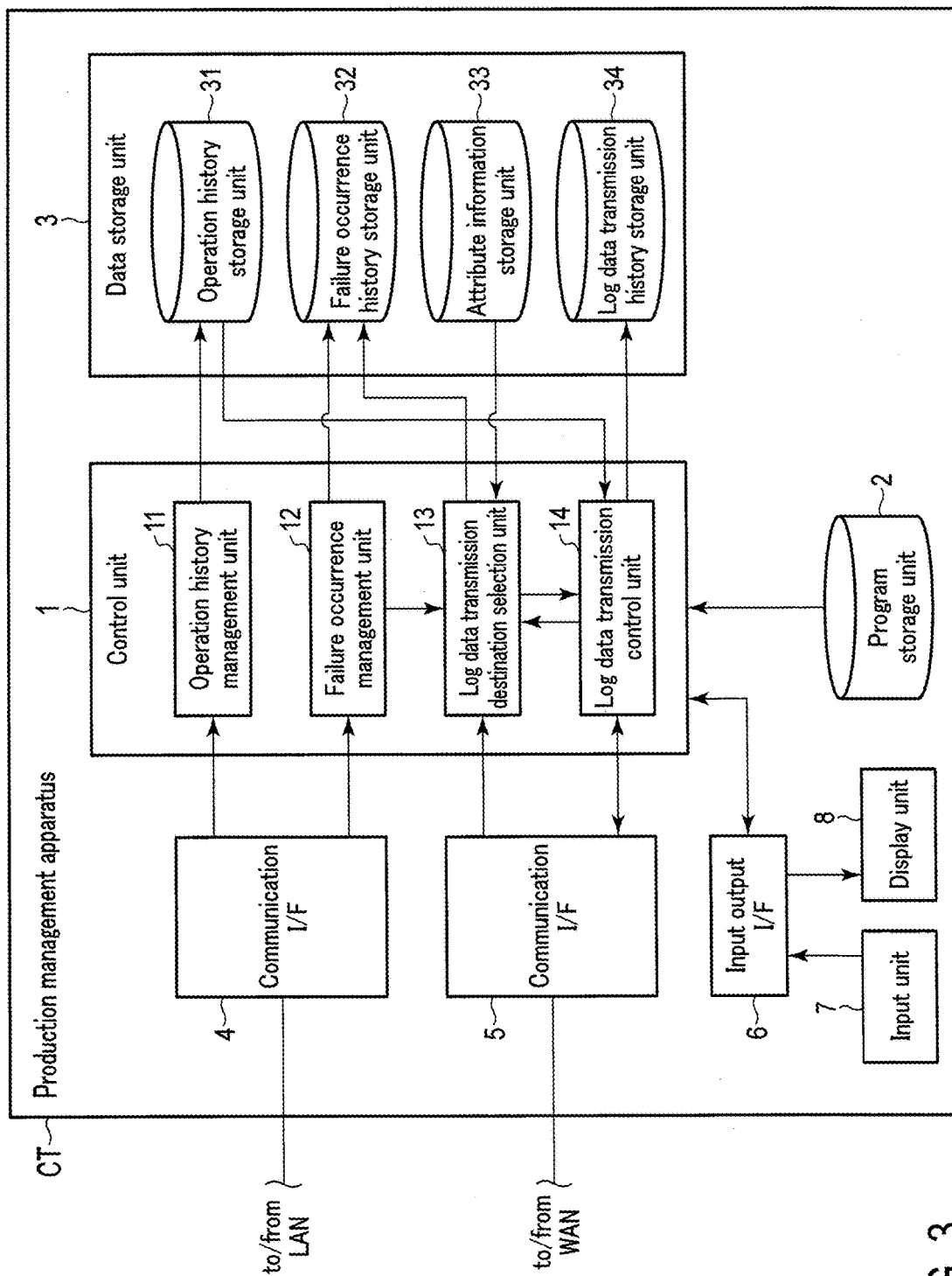
F I G. 3

| Failure ID | Component group ID |
|---|---|
| FL1 | PG1 |
| FL2 | PG2 |
| ⋮ | ⋮ |
| FLk | PGk |

FIG. 4

| Component group ID | Component/software ID |
|---|---|
| PG1 | P1, P2, ··· Q1 |
| PG2 | P3, P4, ··· Q2 |
| ⋮ | ⋮ |
| PGk | P2, Py, ···Qx |

FIG. 5

| Component group ID | Component/software ID | Degree of involvement |
|---|---|---|
| PG1 | P1 | W1 |
| | P2 | W2 |
| | ⋮ | ⋮ |
| | Ql | Wl |

FIG. 6

| Component/software ID | Component manufacturer/software vendor ID |
|---|---|
| P1 | PM1 |
| P2 | PM2 |
| ⋮ | ⋮ |
| Qx | QV1 |

FIG. 7

DATA DISTRIBUTION CONTROL APPARATUS, DATA DISTRIBUTION CONTROL METHOD, AND NON-TRANSITORY COMPUTER-READABLE MEDIUM

CROSS-REFERENCE TO RELATED APPLICATION

This application is a Continuation Application of PCT Application No. PCT/JP2021/011120, filed Mar. 18, 2021 and based upon and claiming the benefit of priority from Japanese Patent Application No. 2020-049208, filed Mar. 19, 2020, the entire contents of which are incorporated herein by reference.

FIELD

Embodiments of the present invention relate to a data distribution control apparatus, a data distribution control method, and a non-transitory computer-readable medium recording a data distribution control program for controlling data distribution from a data owner to a data user.

BACKGROUND

For example, in a manufacturing field, there is known a system that diagnoses an operation state of a facility of a manufacturer, etc., by using a network. For example, Patent Literature 1 describes a system that diagnoses a breakdown in a machine by transmitting data indicating an operation state of the machine to a diagnosis center via a network and accumulating in the diagnosis center the received data indicating the operation state. At the occurrence of a breakdown in a machine, this type of system enables a diagnosis center to immediately detect the situation and generate an alarm, etc.

CITATION LIST

Patent Literature

Jpn. Pat. Appln. KOKAI Publication No. 2019-185292

SUMMARY

Technical Problem

Recently, there has been a growing number of cases in which such a diagnosis of a facility as described above is outsourced to an external support center without being performed by a diagnosis center operated and managed by a manufacturer. Even in the case where a manufacturer operates and manages a support center, diagnosis of some functions of a facility may be outsourced from the support center to, for example, a component manufacturer or a software vendor.

However, in the case where the existing technique is applied as it is, data indicating an operation state of a facility is unconditionally transmitted to an outside source. This causes a risk that even confidential data relating to the manufacturing of a product, which is not necessary for the detection or diagnosis of a failure, may be leaked to the outside source, and the confidentiality of the data may be lost.

The present invention has been made in view of the above circumstances, and an object of the present invention is to provide a technique that can maintain confidentiality of data in the case of outsourcing an analysis of an operation state of a facility.

Solution to Problem

In order to achieve the object described above, one aspect of a data distribution control apparatus and a data distribution control method according to the present invention stores, when selectively transmitting log data relating to an operation state of a facility to a plurality of data users via a network, attribute information indicating a relevance between a type of a failure expected to occur in the facility and each of the data users in in a second memory medium. Then, the log data is acquired and chronologically stored, and at the occurrence of a failure in the facility, a data user having a relevance to the failure is selected from among the plurality of users based on the attribute information, and the log data relating to an operation state of the facility in which the failure has occurred is read as a distribution object and is transmitted to the selected data user via the network.

Advantageous Effects of Invention

According to one aspect of the present invention, for example, at the occurrence of a failure in a facility, a data user having a relevance to a type of the failure is selected, and log data relating to an operation state of the facility is transmitted to this data user only. This prevents log data from being transmitted to a data user having a low relevance to the occurrence of failure, so that the confidentiality of log data can be maintained at a high level as compared to a case in which log data is unconditionally transmitted to all data users.

That is, according to one aspect of the present invention, it is possible to provide a technique that can maintain confidentiality of data in the case of outsourcing analysis of an operation state of a facility.

BRIEF DESCRIPTION OF THE DRAWINGS

FIG. 3 is a block diagram showing a software configuration of the production management apparatus including a function of the data distribution control apparatus according to an embodiment of the present invention.

FIG. 4 is a diagram showing an example of a failure/component group database provided in the production management apparatus shown in FIG. 3.

FIG. 5 is a diagram showing an example of a component group/component and software database provided in the production management apparatus shown in FIG. 3.

FIG. 6 is a diagram showing an example of a degree-of-involvement database indicating a degree of involvement by a component and software in a failure.

FIG. 7 is a diagram showing an example of a data transmission destination database.

DETAILED DESCRIPTION

Hereinafter, embodiments according to the present invention will be described with reference to the drawings.

Embodiment

Configuration Example (1) System

Figure 1:
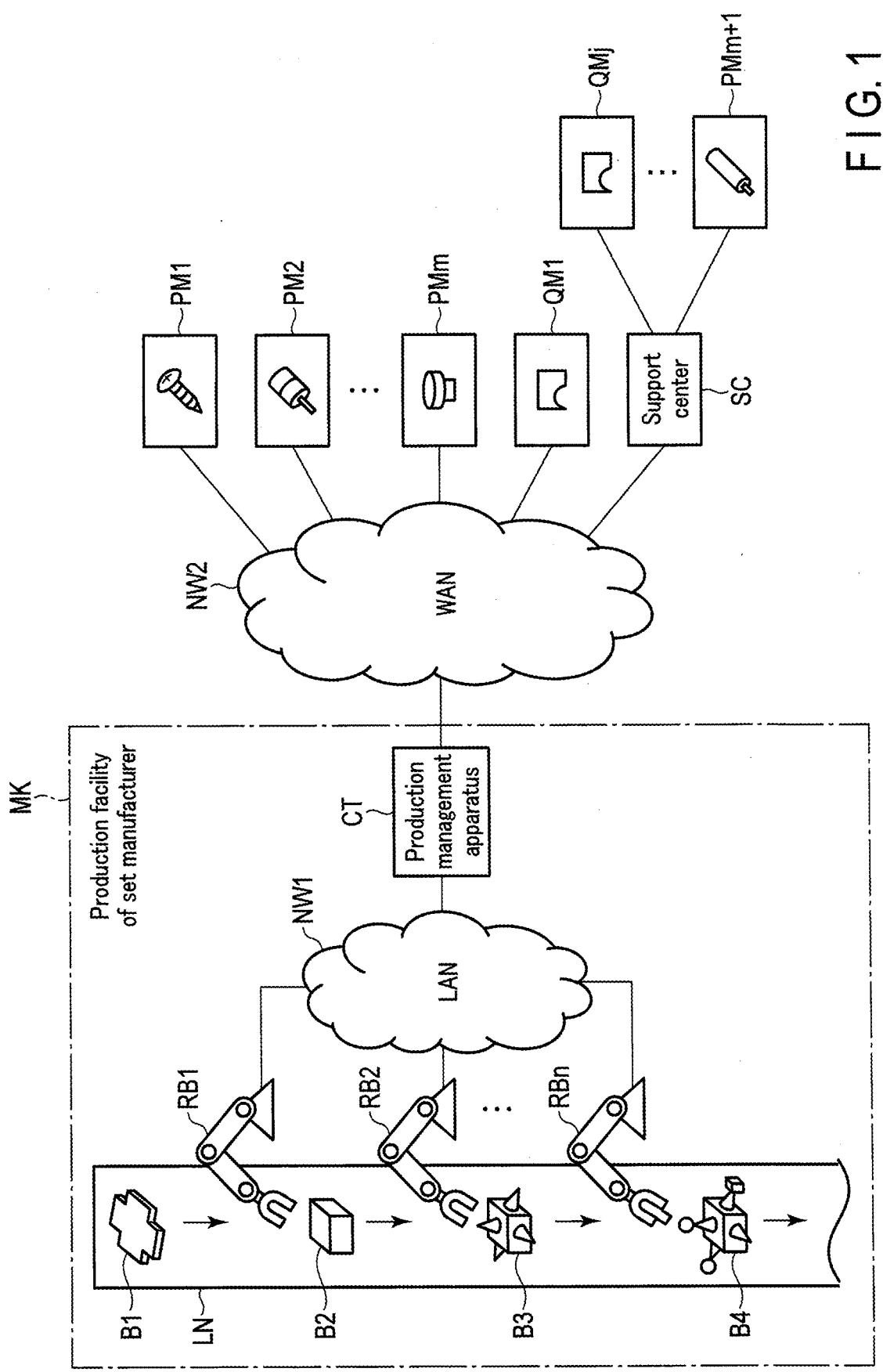
FIG. 1 is a diagram showing an overall configuration of a failure analysis support system including a data distribution control apparatus according to an embodiment of the present invention.

FIG. 1 is a diagram showing an overall configuration of a system including a data distribution control apparatus according to an embodiment of the present invention.

In FIG. 1, MK denotes a production facility of a set manufacturer, for example. The manufacturing facility MK includes, for example, a production line LN in which a plurality of manufacturing apparatuses RB1 to RBn are arranged in a direction in which the production line LN moves. For example, the manufacturing apparatuses RB1 to RBn share and conduct work of bending and joining a plate-shaped component B1 carried in from another line or a component supplying apparatus (not illustrated), thereby forming a base B2 of a set, and sequentially attaching a plurality of components to the base B2 in a step-by-step manner, thereby assembling sets B3 and B4.

Each of the manufacturing apparatuses RB1 to RBn includes, for example, an assembly robot, and executes a pre-designated assembling operation under the control of a manufacturing controller such as a programmable logic controller (PLC) (not illustrated). In order to control and monitor the assembling operation, the manufacturing apparatuses RB1 to RBn are provided with a plurality of sensors (illustration omitted). Each of these sensors outputs sensor data indicating an operation state of a plurality of portions of each of the manufacturing apparatuses RB1 to RBn. Sensor data output from each of the sensors is transferred to a production management apparatus CT via a local area network (LAN) NW1 established within the production facility MK.

The configuration of the production line LN, the type and number of the manufacturing apparatuses RB1, RB2, . . . , the operation contents of the manufacturing apparatuses RB1, RB2, . . . , and the configuration of a product to be manufactured, the type and contents of operation states to be detected by the sensors, etc., may be freely selected, and the LAN is not limited to a wired LAN but may be a wireless LAN.

The production management apparatus CT is capable of communicating data with a plurality of component manufacturers PM1 to PMm+1 and software vendors QM1 to QMj either directly via a wide area network (WAN) NW2 or with an external support center SC intervening therebetween. Herein, the component manufacturers PM1 to PMm+1, the software vendors QM1 to QMj, and the external support center SC include a terminal device or a server device for the data communication described above.

At the occurrence of a failure in the manufacturing apparatuses RB1 to RBn, the production management apparatus CT transmits sensor data of these manufacturing apparatuses RB1 to RBn as log data indicating their operation states at the time of occurrence of the failure, to the component manufacturers PM1 to PMm+1, the software vendors QM1 to QMj, or the external support center SC via the WAN. The component manufacturers PM1 to PMm+1, the software vendors QM1 to QMj, and the external support center SC execute analysis processing for estimating a cause or sign of the failure based on log data transmitted from the production management apparatus CT, and return information indicating a result of the analysis to the production management apparatus CT serving as a request source via the WAN.

(2) Production Management Apparatus CT

Figure 2:
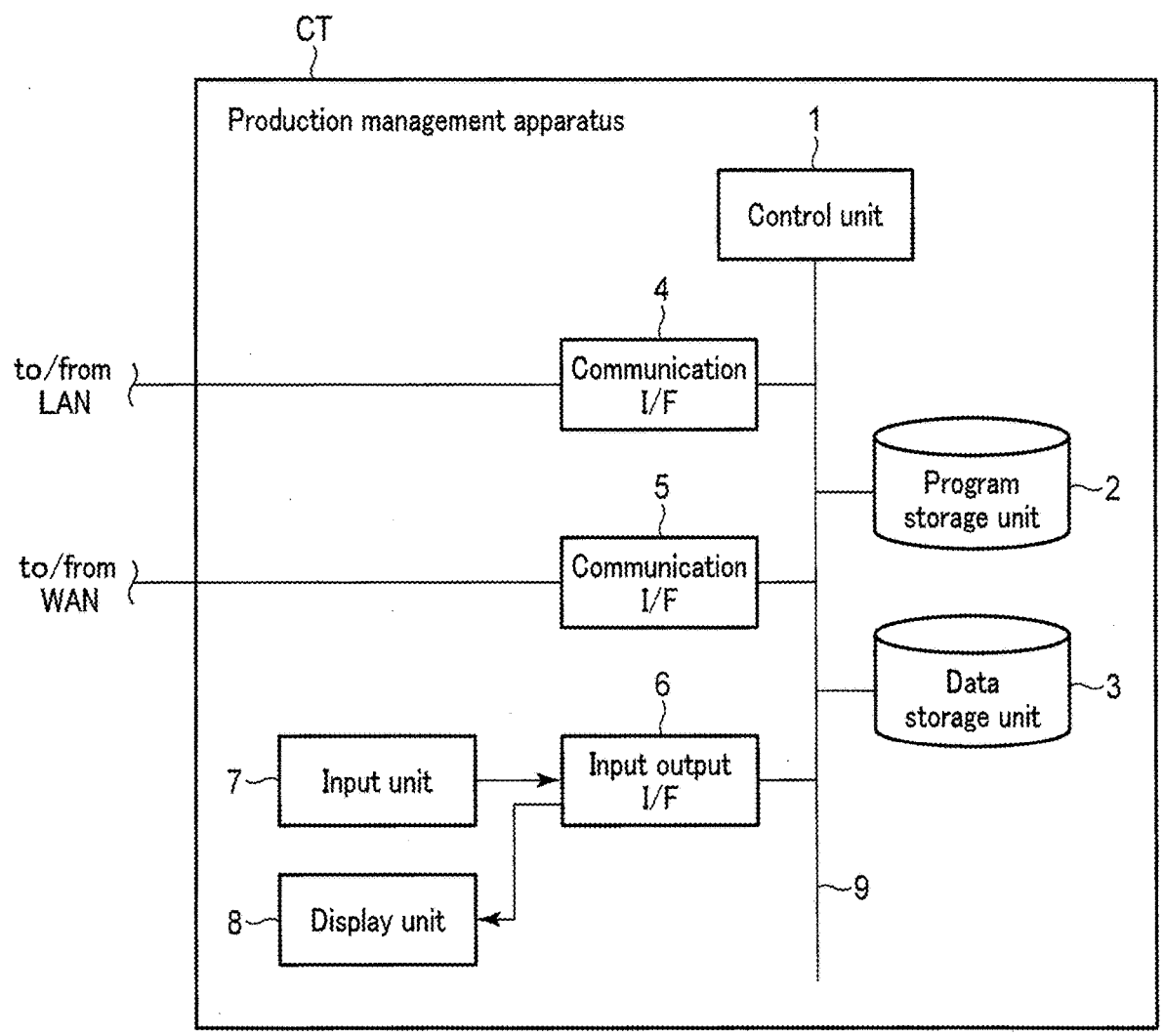
FIG. 2 is a block diagram showing a hardware configuration of a production management apparatus including a function of the data distribution control apparatus according to an embodiment of the present invention.

FIGS. 2 and 3 are block diagrams respectively showing a hardware configuration and a software configuration of the production management apparatus CT.

The production management apparatus CT has a function as a data distribution control apparatus according to an embodiment of the present invention, and is configured by, for example, a server computer or a personal computer. The production management apparatus CT may be installed in the production facility MK of the set manufacturer, or may be installed in the cloud or on the Web.

The production management apparatus CT includes a control unit 1 having a hardware processor such as a central processing unit (CPU) which is processing circuitry, etc., to which a program storage unit 2, a data storage unit 3, communication interfaces (communication I/F) 4 and 5, and an input/output interface (input/output I/F) 6 are connected via a bus 9.

The communication I/F 4 performs data communications with a LAN under a communication protocol defined in the LAN, and under the control of the control unit 1, mainly receives sensor data and alarm data transmitted from the manufacturing apparatuses RB1 to RBn. The communication I/F 5 performs data communications with a WAN under a communication protocol defined in the WAN, and under the control of the control unit 1, performs transmission of log data and reception of information indicating a failure analysis result to and from the component manufacturers PM1 to PMm+1, the software vendors Q1 to Qj, or the external support center SC.

An input unit 7 and a display unit 8 are connected to the input/output I/F 6. The input unit 7 and the display unit 8 are used, for example, by a production manager to input various types of setting information to the production management apparatus CT and to display, at the occurrence of a failure, alarm information of the event and an analysis result of the failure.

The program storage unit 2 uses, for example, as a main storage medium, a nonvolatile memory such as a hard disk drive (HDD) or a solid state drive (SSD), which allows writing and reading at any time, and a storage area of the program storage unit 2 stores, in addition to middlewear such as an operating system (OS), programs for executing various types of processing according to an embodiment of the present invention. The storage medium may be configured by the aforementioned HDD or SSD in combination with a read only memory (ROM).

The data storage unit 3 is, for example, a combination of an HDD or an SSD and a random access memory (RAM), and a storage area of the data storage unit 3 is provided with an operation history storage unit 31, a failure occurrence history storage unit 32, an attribute information storage unit 33, and a log data transmission history storage unit 34, which are used in an embodiment of the present invention.

The operation history storage unit 31 is used to chronologically store sensor data output from each of the sensors of the manufacturing apparatuses RB1 to RBn together with an ID of a manufacturing apparatus serving as a generation source, and an ID of a corresponding sensor.

For each of the manufacturing apparatuses RB1 to RBn, the failure occurrence history storage unit 32 stores alarm data respectively generated from sensors of the manufacturing apparatuses RB1 to RBn together with an occurrence time, an ID of a manufacturing apparatus serving as a generation source and an ID of a corresponding sensor. The failure occurrence history storage unit 32 also stores information indicating a failure analysis result that has been returned from the component manufacturers PM1 to PMm+1, the software vendors Q1 to Qj, or the external support center SC.

The attribute information storage unit 33 stores, using a plurality of databases, attribute information which defines a correspondence relationship between a type of a failure expected to occur in the manufacturing apparatuses RB1 to RBn and a component or software having a relevance to the failure. An exemplary configuration of a database will be described later.

The log data transmission history storage unit 34 is used to store information indicating a transmission history of log data transmitted to a component manufacturer, a software vendor, or the external support center SC.

The control unit 1 includes, as processing functions according to an embodiment of the present invention, an operation history management unit 11, a failure occurrence management unit 12, a log data transmission destination selection unit 13, and a log data transmission control unit 14. Each of the processing units 11 to 14 is realized by causing a hardware processor of the control unit 1 to execute a program stored in the program storage unit 2.

The operation history management unit 11 receives sensor data output from a plurality of sensors of each of the manufacturing apparatuses RB1 to RBn via the communication I/F 4, associates each of the received sensor data with an ID of a manufacturing apparatus serving as a transmission source and an ID of a corresponding sensor, and chronologically stores the sensor data as log data indicating operation states of the manufacturing apparatuses RB1 to RBn in the operation history storage unit 31.

The failure occurrence management unit 12 performs processing of: receiving, via the communication I/F 4, alarm data respectively output from sensors of each of the manufacturing apparatuses RB1 to RBn; identifying, based on the received alarm data, a type of a failure; and storing, in the failure occurrence history storage unit 32, a failure ID indicating the identified type of the failure together with an alarm occurrence time, an ID of a manufacturing apparatus serving as an alarm generation source, and an ID of a corresponding sensor. Failures include an operation state indicating a sign of a failure.

In the case of detecting the occurrence of a failure (including signs of failure) according to the alarm data, the log data transmission destination selection unit 13 specifies a component or software having a relevance to the failure based on attribute information stored in the attribute information storage unit 33. The log data transmission destination selection unit 13 executes processing of selecting, as a log data transmission destination, the specified component manufactures PM1 to PMm+1, the software vendors Q1 to Qj, or the external support center SC.

The log data transmission destination selection unit 13 further performs processing of: receiving, via the communication I/F 5, information indicating a failure analysis result that has been returned from the component manufacturers PM1 to PMm+1, the software vendors Q1 to Qj, or the external support center SC, which has or have served a transmission destination of the log data; and storing the received information in the failure occurrence history storage unit 32.

The log data transmission control unit 14 selectively reads, from the operation history storage unit 31, log data including sensor data generated during a time range set in advance by using a failure occurrence timing as the reference, from among the sensor data generated from the manufacturing apparatuses RB1 to RBn serving as a failure occurrence source. The log data transmission control unit 14 then performs processing of transmitting the read log data from the communication I/F 5 to the component manufacturers PM1 to PMm+1, the software vendors Q1 to Qj, or the external support center SC, which has or have been selected as a transmission destination by the log data transmission destination selection unit 13.

At a predetermined timing after transmitting log data, the log data transmission control unit 14 performs processing of transmitting a log data erasure request from the communication I/F 5 to the component manufacturers PM1 to PMm+1, the software vendors Q1 to Qj, or the external support center SC, which has or have served as a log data transmission destination.

Operation Example

Next, an operation example of the production management apparatus CT configured as described above will be described.

(1) Setting of Attribute Information

Before the system starts to operate, attribute information is set. This attribute information is set by a production manager inputting necessary data to the input unit 7. Under the control of the control unit 1, the production management apparatus CT captures, via the input/output I/F 6, the data input to the input unit 7 and stores the data in the attribute information storage unit 33, thereby generating attribute information.

The attribute information is divided and stored in, for example, a failure/component group database, a component group/component and software database, a degree-of-involvement database, and a data transmission destination database.

The failure/component group database stores a component group ID (PG1, PG2, . . . ) having a possibility of being involved in an occurrence of a failure in such a manner that the component group ID is associated with a failure ID (FL1, FL2, . . . ) indicating a type of the failure, as shown in FIG. 4, for example. The component group/component and software database stores a component ID (PG1, PG2, . . . ) of a component and a software ID (Q1, Q2, . . . ) in such a manner that these IDs are associated with a component group ID (PG1, PG2) of a component group including the aforementioned component and software, as shown in FIG. 5, for example.

The degree-of-involvement database stores, for each component group ID (PG1, PG2, . . . ), a degree of involvement by a component and software in a failure (for example, W1, W2, . . . in descending order of the degree of involvement) in such a manner that each of these degrees are associated with a component ID (P1, P2, . . . ) and a software ID (Q1, Q2, . . . ) corresponding to a component group with the component group ID, as shown in FIG. 6, for example. The data transmission destination database stores an ID (PM1, PM2, . . . ) for identifying a manufacturer of a component and an ID (QV1, . . . ) for identifying a vendor of software in such a manner that each of these IDs is associated with a component ID (P1, P2, . . . ) of the component and a software ID (Q1, Q2, . . . ) of the software, as shown in FIG. 7, for example. In the state shown in FIG. 7, only component manufacture IDs (PM1, PM2, . . . ) and software vendor IDs (QV1, . . . ) are stored; however, in reality, names or destination addresses, etc., of component manufacturers and software vendors are stored.

(2) Data Distribution Control

Figure 8:
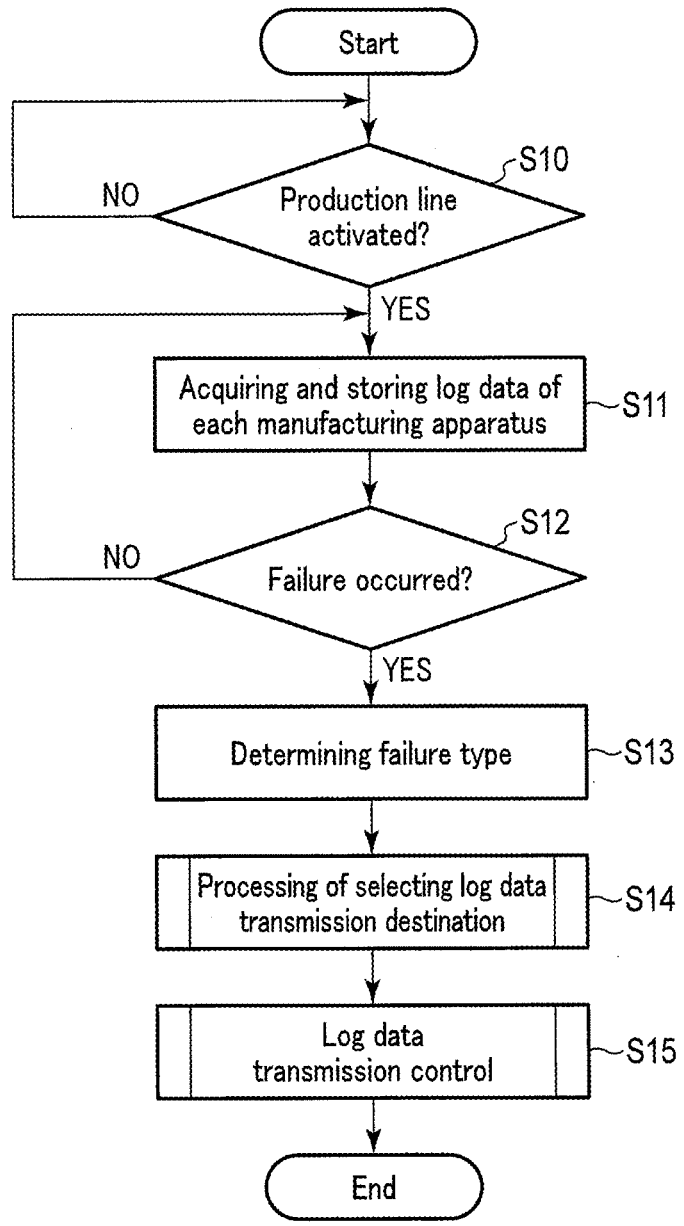
FIG. 8 is a flowchart showing a processing procedure and processing contents of data distribution control by the production management apparatus shown in FIG. 3.

FIG. 8 is a flowchart showing an example of the overall processing procedure and processing contents of data distribution control operation by the production management device CT.

(2-1) Management of Operation History

The control unit 1 of the production management apparatus CT monitors the activation of the production line LN in step S10 shown in FIG. 8. When the production line LN is activated in this state, each of the manufacturing apparatuses RB1 to RBn starts its operation. Then, the operation states of the manufacturing apparatuses RB1 to RBn are respectively detected by the sensors, and sensor data is output.

Under the control of the operation history management unit 11, in step S11, the control unit 1 of the production management apparatus CT receives the sensor data output from each of the manufacturing apparatuses RB1 to RBn via the communication I/F 4, and stores the received sensor data in the operation history storage unit 31 in such a manner that the sensor data is associated with an ID of a manufacturing apparatus serving as a transmission source and an ID of a corresponding sensor. Sensor data is chronological data, and is assigned information indicating a detection timing or a reception timing. Sensor data may be acquired through real-time processing or through batch processing in which sensor data is collectively acquired for a fixed amount of time.

(2-2) Management of Failure Occurrence History

While the production line LN is in operation, under the control of the failure occurrence management unit 12, the control unit 1 of the production management apparatus CT monitors, in step S12, the generation of alarm data from the manufacturing apparatuses RB1 to RBn.

In this state, for example, when a failure (including signs of failure) occurs in the manufacturing apparatus RB1 and alarm data is output accordingly, the failure occurrence management unit 12 receives the alarm data via the communication I/F 4. Then, in step S13, the failure occurrence management unit 12 identifies a type of the failure. Subsequently, the failure occurrence management unit 12 sends, to the log data transmission destination selection unit 13, a notification of an ID indicating the identified failure type together with a failure occurrence notification, and stores, in the failure occurrence history storage unit 32, the failure type ID together with information indicating a failure occurrence timing and information indicating an ID of the manufacturing apparatus RB1 serving as a failure occurrence source and a failure occurrence location.

(2-3) Selection of Log Data Transmission Destination and Transmission

Upon receipt of the failure occurrence notification, the control unit 1 of the production management apparatus CT first proceeds to step S14, and executes processing of selecting a transmission destination of log data under the control of the log data transmission destination selection unit 13, as will be described below.

Figure 9:
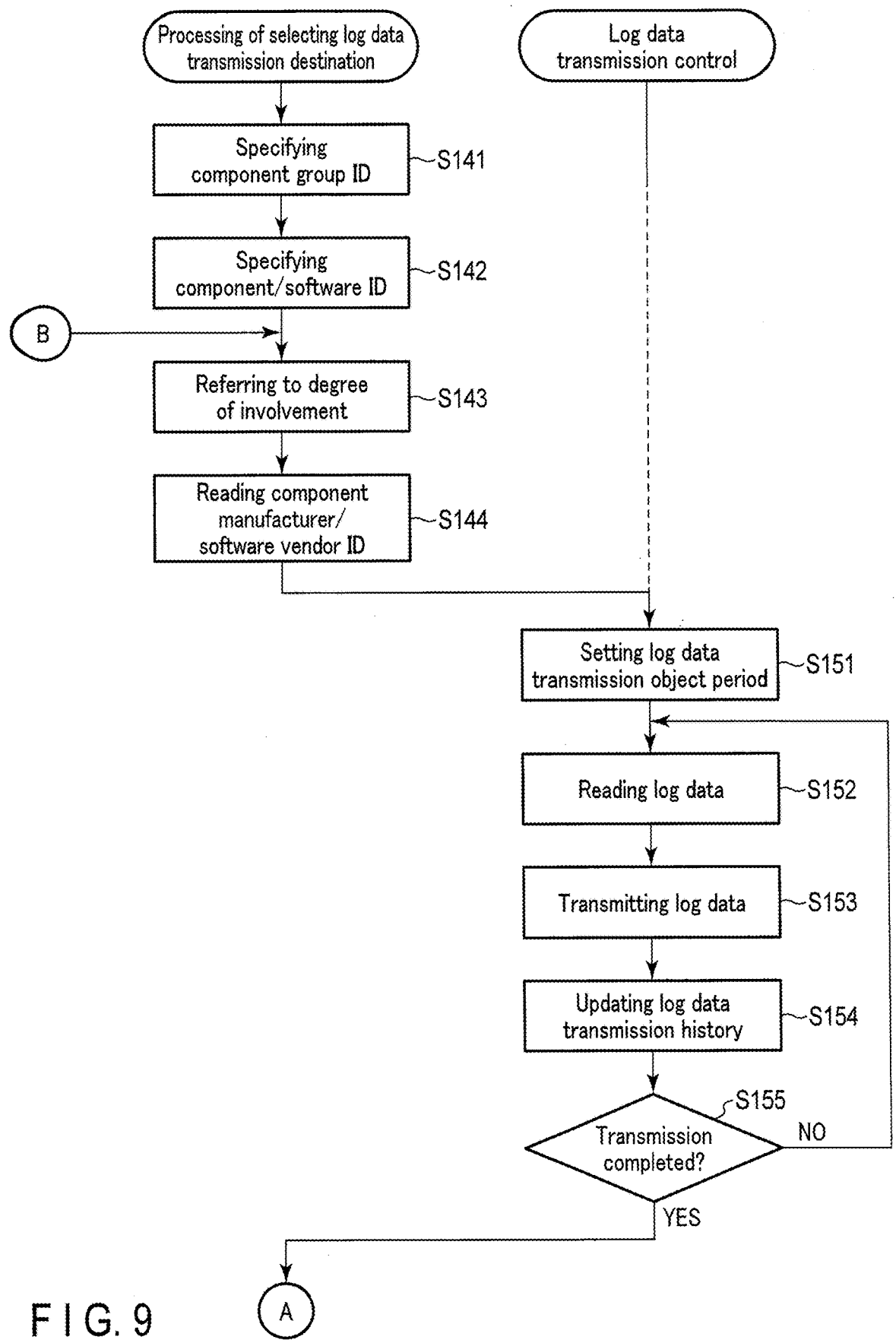
FIG. 9 is a flowchart showing a first half of data transmission destination selection processing and data transmission control processing in the processing procedure shown in FIG. 8.
Figure 10:
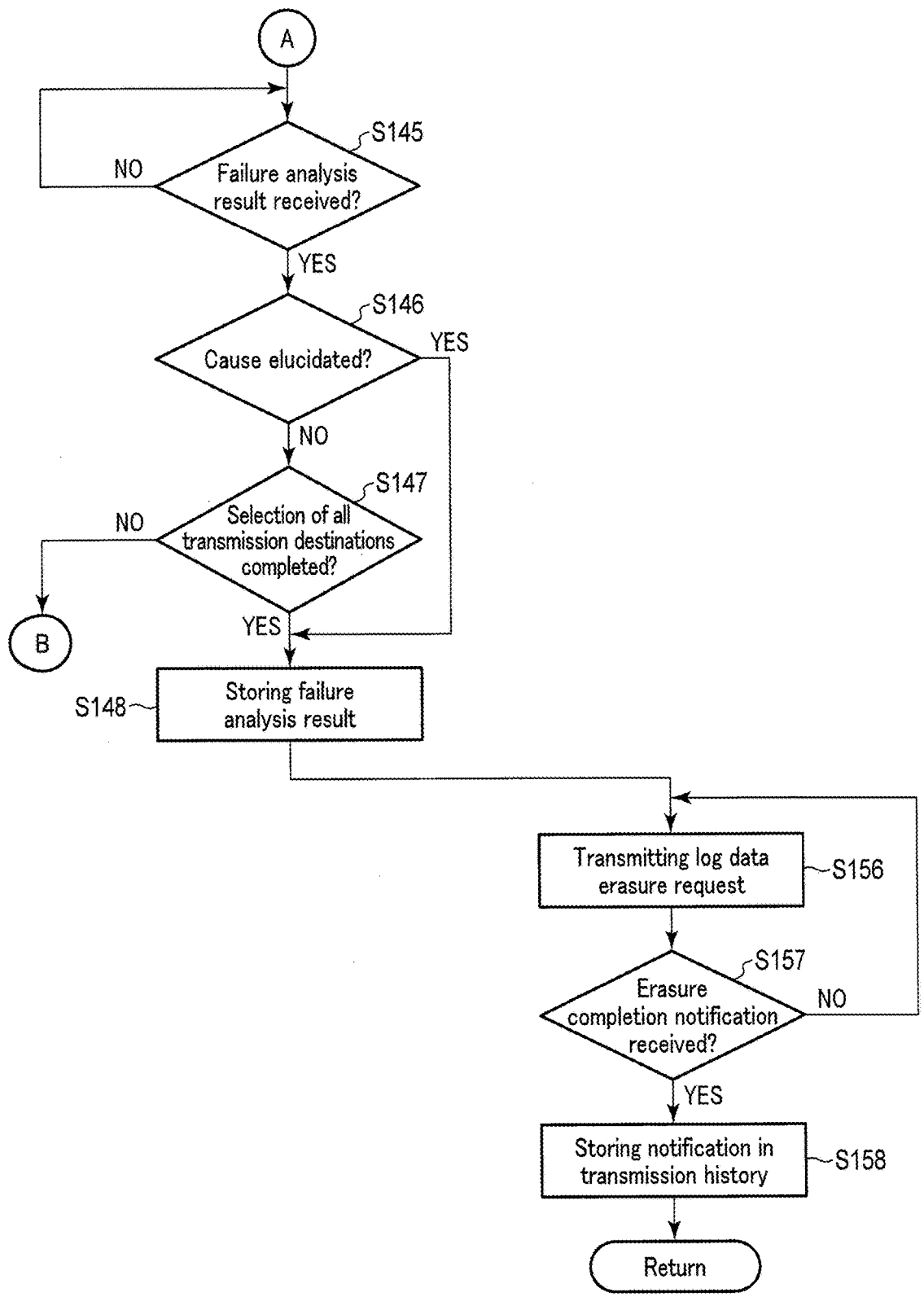
FIG. 10 is a flowchart showing a second half of data transmission destination selection processing and data transmission control processing in the processing procedure shown in FIG. 8.

FIGS. 9 and 10 are flowcharts each showing steps of controlling selection of a log data transmission destination by the log data transmission destination selection unit 13, together with steps of controlling log data transmission to be described later.

The log data transmission destination selection unit 13 first refers to the failure/component group database (FIG. 4) in step S141, and retrieves a component group ID corresponding to the failure type ID notified by the failure occurrence management unit 12. That is, the log data transmission destination selection unit 13 specifies a component group which may be involved in the occurrence of the failure. Next, in step S142, the log data transmission destination selection unit 13 refers to the component group/component and software database (FIG. 5), thereby retrieving a component and software ID corresponding to the aforementioned component group ID. That is, the log data transmission destination selection unit 13 specifies a component and software that may be involved in the occurrence of the failure.

Furthermore, in step S143, the log data transmission destination selection unit 13 refers to the degree-of-involvement database (FIG. 6), thereby retrieving degrees of involvement W1, W2, . . . , set for each of the specified component and software. Subsequently, in step S144, the log data transmission destination selection unit 13 first selects, based on the retrieved degrees of involvement W1, W2, . . . , a component and software assigned the highest degree of involvement W1. That is, the log data transmission destination selection unit 13 selects a component and software ID assigned a degree of involvement equal to or greater than the first threshold. The log data transmission destination selection unit 13 then retrieves, from the data transmission destination database (FIG. 7), information on a component manufacturer and a software vendor corresponding to the selected component and software ID, and notifies the log data transmission control unit 14 of the information.

Upon completion of the processing of selecting the transmission destination, the control unit 1 of the production management apparatus CT proceeds to step S15, thereby executing the processing of transmitting log data under the control of transmission control unit 14, as will be described below.

That is, first, in step S151, while using a timing of the failure occurrence as the reference, the log data transmission control unit 14 sets, as a log data transmission object period, a preset time range before the occurrence timing. A value of the above time range may be set to be common among all of the manufacturing apparatuses RB1 to RBn or may be set to differ therebetween depending on an operation time of one cycle of each of the manufacturing apparatuses RB1 to RBn. Values of the time ranges are stored in advance in the data storage unit 3.

Subsequently, in step S152, the log data transmission control unit 14 selectively reads, from the operation history storage unit 31, log data which corresponds to the log data transmission object period, among the log data indicating an operation state of the manufacturing apparatus RB1 in which the failure is detected. In step S153, the log data transmission control unit 14 then transmits the read log data from the communication I/F 5 to the component manufacturer and software vendor, which have been selected as a transmission destination by the log data transmission destination selection unit 13.

This transmission of log data is similar to that in the existing system in that authentication is performed with a transmission destination and the log data is encrypted according to a predetermined rule.

After transmission of the log data, in step S154, the log data transmission control unit 14 issues an event number in the order of occurrence of a failure, for example, and stores, in the log data transmission history storage unit 34, a failure type ID, an ID of a manufacturing apparatus that has served as a failure occurrence source, a transmission destination of the log data, a transmission time, and a time scope of the transmitted log data in such a manner that they are associated with the issued event number.

Finally, in step S155, the log data transmission control unit 14 determines whether or not the transmission of log data has been completed for all of the transmission destinations. As a result of this determination, if there still exists a transmission destination to which log data has not been transmitted, the processing returns to step S152, and a series of log data transmission processing steps from S152 to S154 is repeated. On the other hand, upon completion of the transmission of log data for all of the transmission destinations, the log data transmission control unit 14 notifies the log data transmission destination selection unit 13 of this fact.

Upon receipt of the notification of transmission completion, first, in step S145, the log data transmission destination selection unit 13 monitors reception of information indicating a failure analysis result from the component manufacturer or software vendor serving as a transmission destination, as shown in FIG. 10. Upon receipt of information indicating the failure analysis result, in step S146, a determination as to whether or not a cause of failure occurrence has been elucidated is made based on the received information indicating the failure analysis result. As a result of this determination, if the cause is elucidated, in step S148, information indicating the failure analysis result is associated with a failure type ID corresponding to the information indicating the failure analysis result and is then stored in the failure occurrence history storage unit 32.

On the other hand, it is assumed that a cause of a failure is not elucidated from the received failure analysis result. In this case, in step S147, the log data transmission destination selection unit 13 determines whether or not log data transmission has been completed for all of the transmission destinations involved in the occurrence of the failure. As a result of this determination, in the case where there still exists a transmission destination to which log data has not been transmitted, the log data transmission destination selection unit 13 returns to step S143 shown in FIG. 9. The log data transmission destination selection unit 13 then selects, from among the degrees of involvement W1, W2, . . . , retrieved from the degree-of-involvement database, the second highest degree of involvement W2, and selects a component ID and a software ID assigned this degree of involvement W2. That is, the log data transmission destination selection unit 13 selects a component and software assigned a degree of involvement smaller than the first threshold value and equal to or greater than the second threshold. The log data transmission destination selection unit 13 then retrieves, from the data transmission destination database (FIG. 7), information on a component manufacturer and a software vendor corresponding to the selected component ID and software ID, and notifies the log data transmission control unit 14 of the information.

As in the case of the degree of involvement W1 described above, the log data transmission control unit 14 transmits log data on the manufacturing apparatus RB1 in which the failure has occurred to the component manufacturer and software vendor assigned the aforementioned degree of involvement W2 through steps S151 to S155. This transmission of log data is similar to that in the case described above in that only data which is included in a predetermined time range before a failure occurrence timing is transmitted.

Similarly, in the case where degrees of involvement W3, W4, . . . , smaller than the aforementioned degrees of involvement W1 and W2 are assigned as a degree of involvement to a component or software corresponding to the occurrence of failure, component manufacturers or software vendors are selected in descending order of these degrees of involvement W3, W4, . . . .

(2-4) Erasure of Transmitted Log Data

Suppose that failure analysis result information including information indicating that a failure occurrence cause has been elucidated is returned from a log data transmission destination or that transmission of log data is completed for all of the component or software manufactures or vendors that may be involved in the failure. In this case, in step S156, the log data transmission control unit 14 designates, with respect to a manufacturer and a software vendor serving as a transmission destination, a set of log data already transmitted thereto and transmits an erasure request of this set.

Upon receipt of the erasure request of the log data, the component manufacturer and software vendor batch-erase the log data stored for the analysis processing. After completion of the erasure, the component manufacturer and software vendor return an erasure completion notification to the production management apparatus CT.

Under control of the log data transmission control unit 14, the control unit 1 of the production management apparatus CT monitors the return of the erasure completion notification in step S157. When the erasure completion notification is returned, in step S158, the erasure completion notification is additionally stored in a corresponding log data transmission history of the log data transmission history storage unit 34.

Action and Effect

As described above, the production management apparatus CT according to an embodiment is configured to: store attribute information which defines a correspondence relationship between a type of a failure expected to occur in the manufacturing apparatuses RB1 to RBn and a component or software having a relevance to the failure; at the occurrence of the failure in the manufacturing apparatuses RB1 to RBn, select a component or software manufacturer or vendor having a relevance to a type of the failure; and transmit log data on a manufacturing apparatus in which the failure has occurred to only the selected manufacturer or vendor.

This limits a transmission destination of log data on a manufacturing apparatus to a component manufacturer or software vendor having a relevance to a type of a failure, so that the confidentiality of the log data can be maintained at a high level.

Furthermore, when selecting a log data transmission destination, the production management apparatus CT is configured to: by referring to a degree of reference assigned in advance for each failure type to a component or software related to the failure, select a manufacturer or vendor of a component or software assigned the highest degree of involvement; and in a case where a cause of the failure is not elucidated with the manufacturer or vendor, select a manufacturer or vendor of a component or software having the second highest degree of involvement. In this manner, the production management apparatus CT enlarges log data transmission destinations in a step-by-step manner according to the degree of involvement in a failure assigned to a component or software. This can minimize the range of log data to be transmitted, thereby enabling further improvement in confidentiality of log data, as compared to a case in which log data is batch-transmitted to all of the manufacturers or vendors of components or software having a high possibility of involving in an occurrence of a failure.

Furthermore, at the time of log data transmission, only log data which has occurred during a predetermined time range before a failure occurrence timing is set to a transmission object. This can further limit log data to be transmitted, thereby enabling further improvement in confidentiality of log data.

Furthermore, the log data transmission control unit 14 is configured to: cause a component manufacturer or software vendor serving as a log data transmission destination to erase the log data by transmitting a log data erasure request thereto, for example, after completion of the failure analysis processing; and receive and manage an erasure completion notification in the log data transmission history storage unit 34. This makes it possible to prevent such a problem wherein transmitted log data is used for purposes other than failure analysis in a component manufacturer or software vendor or are transferred to a third party from the component manufacturer or software vendor.

Other Embodiments

In the case described as an example in the above embodiment, distribution control of log data is performed in the production management apparatus CT provided in the production facility MK. However, a similar data distribution control function may be provided in, for example, an external support center SC, etc. This enables control to be performed in such a manner that a transfer destination of log data is further limited even in a case in which the external support center SC transfers the log data received from the production management apparatus CT to, example, a component manufacturer or a software vendor.

In addition, the configuration of a failure type and log data, the configuration of log data, the various functions provided in the data distribution control apparatus, the processing procedure and the processing contents of data distribution control, and the like can be variously modified without departing from the gist of the present invention.

While the embodiment of the present invention has been described in detail, the foregoing description is merely illustrative of the present invention in all respects. As a matter of course, various modifications and variations can be made without departing from the gist of the invention. That is, in carrying out the present invention, a specific configuration according to the embodiment may be appropriately adopted.

In short, the present invention is not limited to the above embodiments as they are, and can be embodied by modifying structural elements in the implementation stage without departing from the gist of the invention. In addition, various inventions may be constituted by appropriately combining a plurality of components disclosed in the above embodiment. For example, some components may be omitted from all the components shown in the embodiment. Furthermore, structural elements over different embodiments may be appropriately combined.

The program according to the present embodiment may be transferred in a state of being stored in an electronic device, or may be transferred in a state of not being stored in an electronic device. In the latter case, the program may be transferred via a network, or may be transferred in a state of being recorded on a recording medium. The recording medium is a non-transitory tangible medium. The recording medium is a computer-readable medium. The recording medium may be any medium as long as it can store a program such as a CD-ROM or a memory card and can be read by a computer, and its form is not limited.

REFERENCE SIGNS LIST

MK . . . Production facility
CT . . . Production management apparatus
LN . . . Production line
RB1 to RBn . . . Manufacturing apparatus
NW1 . . . LAN
NW2 . . . WAN
PM1 to PMm+1 . . . Component manufacturer
Q1 to Qj . . . Software vendor
SC . . . External support center
1 . . . Control unit
2 . . . Program storage unit
3 . . . Data storage unit
4, 5 . . . Communication I/F
6 . . . Input/output I/F
7 . . . Input unit
8 . . . Display unit
9 . . . Bus
11 . . . Operation history management unit
12 . . . Failure occurrence management unit
13 . . . Log data transmission destination selection unit
14 . . . Log data transmission control unit
31 . . . Operation history storage unit
32 . . . Failure occurrence history storage unit
33 . . . Attribute information storage unit
34 . . . Log data transmission history storage unit

The invention claimed is:

1. A data distribution control apparatus configured to selectively transmit log data relating to an operation state of a facility to a plurality of data users via a network, the data distribution control apparatus comprising:
a first non-volatile memory configured to store attribute information indicating a relevance between a type of a failure expected to occur in the facility and each of the data users, wherein the attribute information comprises failure identifiers and component group identifiers, wherein the failure identifiers indicate failure types of manufacturing apparatuses within the facility, and wherein each of the component group identifiers correspond to a degree of involvement by at least one manufacturing apparatus with respect to a failure; and
a controller comprising a hardware processor configured to execute computer-executable instructions that, when executed, cause the hardware processor to:
acquire the log data and store the log data in a second non-volatile memory;
detect an occurrence of a failure associated with the facility;
determine a failure identifier associated with the failure;
determine a component group identifier associated with the failure identifier;
identify a set of manufacturing apparatuses associated with the component group identifier;

for each manufacturing apparatus in the set of manufacturing apparatuses, determine a degree of involvement of the manufacturing apparatus;

select the manufacturing apparatus associated with a highest degree of involvement from the set of manufacturing apparatuses;

identify a first data user associated with the manufacturing apparatus associated with the highest degree of involvement from the set of manufacturing apparatuses; and read, from the second non-volatile memory, as a distribution object, the log data relating to an operation state of the facility in which the failure has occurred, and transmit the read log data to the selected data user via the network.

2. The data distribution control apparatus according to claim 1, wherein the computer-executable instructions, when executed, further cause the hardware processor to:

select, based on the attribute information, a second data user who corresponds to a type of the failure which has occurred and has a degree of involvement in the failure equal to or greater than a preset first threshold, and transmit the log data relating to the operation state of the facility in which the failure has occurred, to the selected second data user.

3. The data distribution control apparatus according to claim 2, wherein the computer-executable instructions, when executed, further cause the hardware processor to:

acquire information indicating an analysis result of the failure from the second data user serving as a transmission destination of the log data;

select, in a case where the acquired information indicating the analysis result includes information indicating that analysis is impossible, based on the attribute information, a third data user having a degree of involvement in the failure smaller than the first threshold and equal to or greater than a preset second threshold; and transmit the log data relating to the operation state of the facility in which the failure has occurred, to the selected third data user.

4. The data distribution control apparatus according to claim 1, wherein the computer-executable instructions, when executed, further cause the hardware processor to:

selectively read from the first non-volatile memory, log data included in a preset time range based on an occurrence timing of the failure from among the log data relating to an operation state of the facility in which the failure has occurred; and transmit the read log data to the selected data user.

5. The data distribution control apparatus according to claim 3, wherein the computer-executable instructions, when executed, further cause the hardware processor to perform processing of erasing the log data stored by the second data user after a preset time has elapsed since the log data is transmitted to the second data user or after the information indicating the analysis result of the failure is acquired from the second data user.

6. The data distribution control apparatus according to claim 1, wherein the type of failure by the at least one manufacturing apparatus corresponds to at least one of a hardware failure or a software failure.

7. A non-transitory computer-readable medium recording a program for causing a hardware processor included in the data distribution control apparatus according to claim 1 to execute the computer-executable instructions included in the data distribution control apparatus.

8. A data distribution control method that is executed by a control apparatus configured to selectively transmit log data relating to an operation state of a facility to a plurality of data users via a network, the data distribution control method comprising:

storing, in a first non-volatile memory, attribute information indicating a relevance between a type of a failure expected to occur in the facility and each of the data users wherein the attribute information comprises failure identifiers and component group identifiers, wherein the failure identifiers indicate failure types of manufacturing apparatuses within the facility, and wherein each of the component group identifiers correspond to a degree of involvement by at least one manufacturing apparatus with respect to a failure;

acquiring the log data and storing the log data in a second non-volatile memory;

detecting an occurrence of a failure associated with the facility;

determining a failure identifier associated with the failure;

determining a component group identifier associated with the failure identifier;

identifying a set of manufacturing apparatuses associated with the component group identifier;

for each of the manufacturing apparatuses in the set of manufacturing apparatuses, determining a degree of involvement of the manufacturing apparatus;

selecting the manufacturing apparatus associated with a highest degree of involvement from the set of manufacturing apparatuses;

identifying a data user associated with the manufacturing apparatus associated with the highest degree of involvement from the set of manufacturing apparatuses; and reading, from the second non-volatile memory, as a distribution object, the log data relating to an operation state of the facility in which the failure has occurred, and transmitting the read log data to the selected data user via the network.

* * * * *